April 12, 1927.
G. W. WALLACE ET AL
1,624,294
CONTROL SYSTEM
Filed Sept. 17, 1923
2 Sheets-Sheet 2
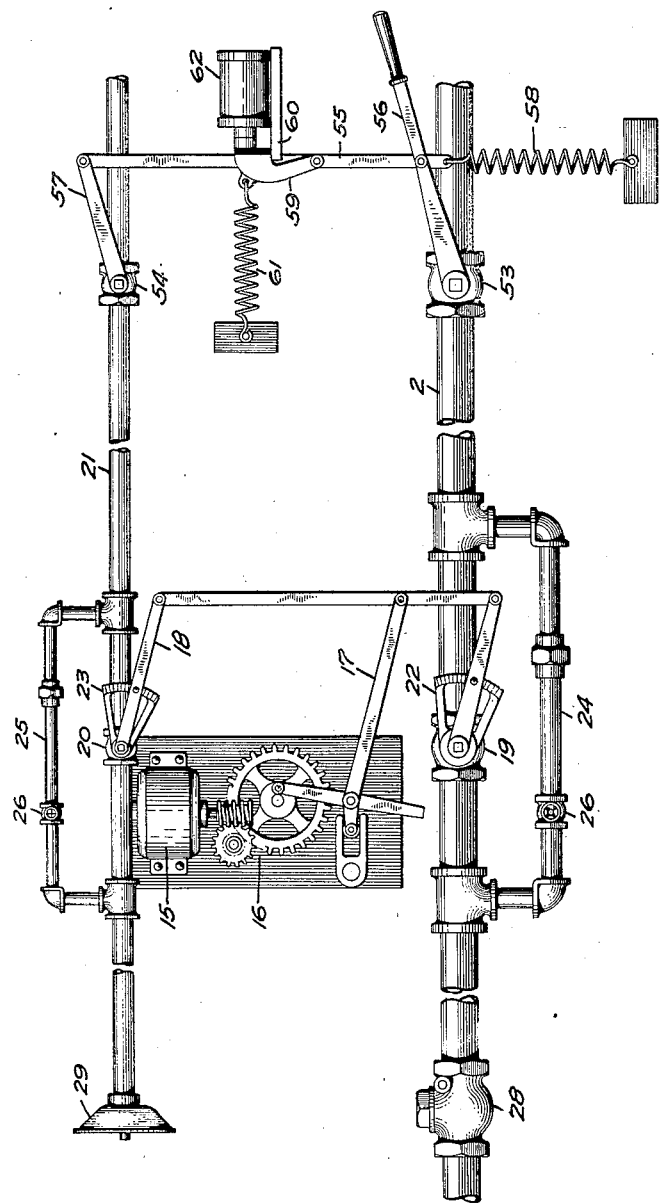
WITNESS:
H. Sherburn
INVENTORS
George W. Wallace
Harry K. Ihrig
BY White Prost & Evans
their ATTORNEYS Patented Apr. 12, 1927.

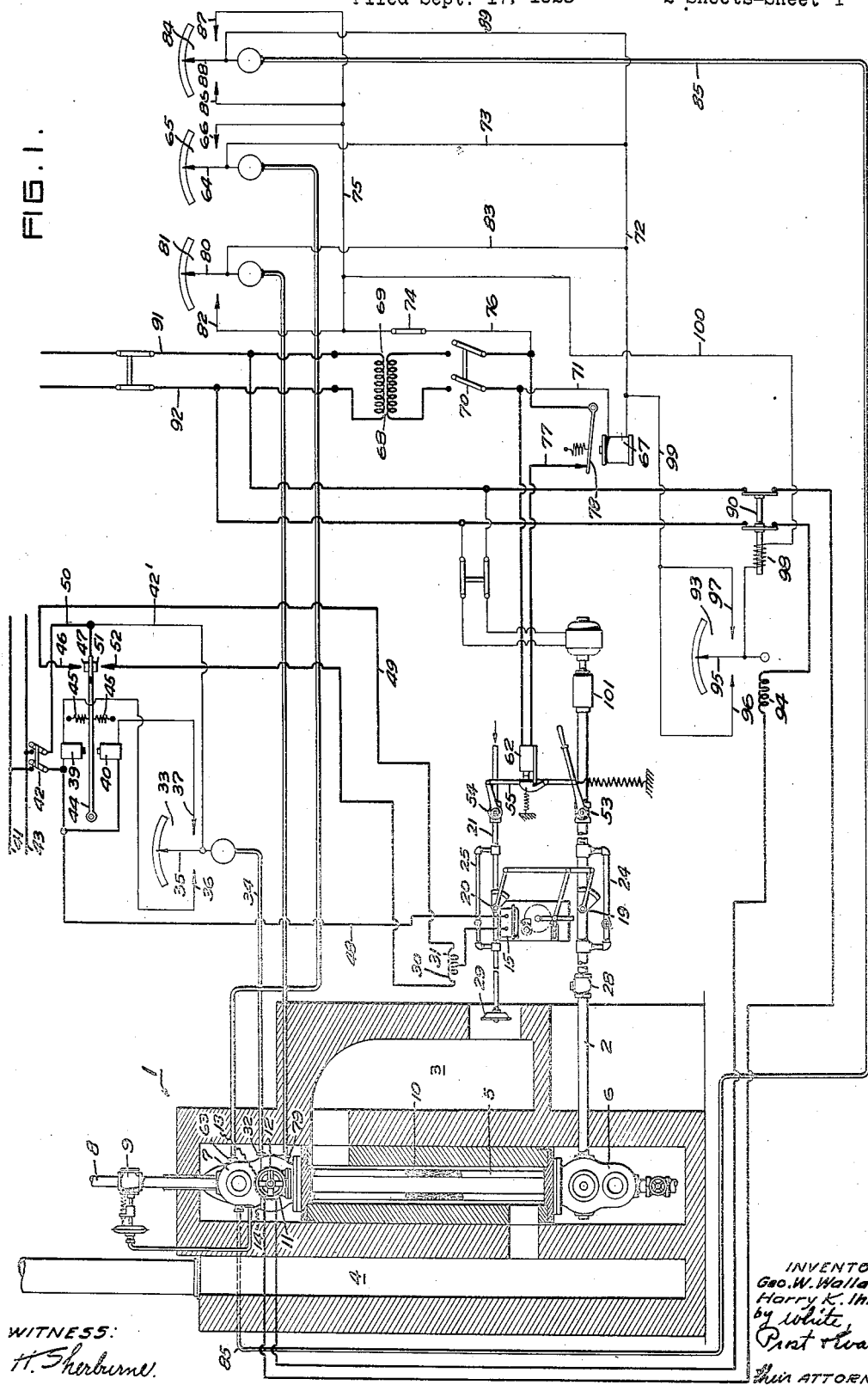

1,624,294

UNITED STATES PATENT OFFICE.

GEORGE W. WALLACE, OF SAN FRANCISCO, AND HARRY K. IHRIG, OF BERKELEY, CALIFORNIA; SAID IHRIG ASSIGNOR TO SAID WALLACE.

CONTROL SYSTEM.

Application filed September 17, 1923. Serial No. 663,032.

This invention relates to a control system, and more particularly to a scheme for automatically regulating a still for cracking hydrocarbons of relatively heavy character, whereby they are converted into lighter liquids or into gases.

In such chemical processes, usually a cracking still is employed, which still is arranged to be supplied with the heavy hydrocarbons, and is subjected at the same time to a very high degree of heat. In large capacity stills, the hydrocarbons to be cracked are continuously supplied to the still as by a pump, and it is therefore necessary to ensure that the supply is at all times properly related to the speed at which the cracking process is accomplished. Due to uncontrollable variations in the character of the oils or hydrocarbons used, as well as to many other factors, variations in the quantity of oil present in the still are bound to occur, unless special measures are taken to guard against undue variations. Not only is it essential from the standpoint of efficiency and for securing a high grade product to maintain the quantity of the hydrocarbon or oil in the still at or near a definite value, but also for ensuring against serious and irreparable injury to the apparatus. It is one of the objects of our invention to make it possible to control the amount of the hydrocarbon in the still in an extremely convenient and novel manner.

It is another object of our invention to improve in general the operation of cracking stills. In one form of still that may be employed, the most feasible manner for controlling the quantity of oil is by maintaining the level of the oil in the still substantially constant. It is of course possible to accomplish this in a more or less satisfactory manner by manual control of the oil supply, based on observations of the level by the operator, as by the aid of a sight glass or the like. In stills of the so-called pressure type, it is essential to maintain the still air tight, and it is obviously not feasible to perform this manual operation. Nor is it at all practicable to use floats or electric contacts for automatic control. The contacts cannot be maintained in proper working order, and sparking produced between the contacts may produce serious explosions. It is thus another object of our invention to provide a simple and practical control for the level of a liquid. So far as this feature of our invention is concerned, the type of control utilized is adapted for use in many systems other than oil cracking systems.

In the cracking of hydrocarbons in apparatus of this general character, we have observed that the temperature of the vapor immediately above the level of the hydrocarbon is very much lower than the temperature of the hydrocarbon itself. It is still another object of our invention to utilize this effect, by the aid of temperature responsive devices, to control the level of the liquid hydrocarbon.

It is still another object of our invention to control the amount of heat imparted to the still simultaneously with the control of the supply of liquid hydrocarbon thereto, the whole control operating to maintain the level of the hydrocarbon in the still substantially constant.

It is still another object of our invention to provide a system for automatically shutting down the still completely on the occurrence of any abnormal condition, such as very low or very high pressure therein, or abnormal departures from the desired liquid level.

In vertical stills of the kind that we shall outline, having vertical pipes in which the hydrocarbons are disposed, it is desirable to prevent the accumulation of deposited matter on the walls of the pipes or tubes. For this purpose we use chains passing through the tubes, which are constantly driven by any appropriate mechanism, as for example an electric motor. In this way, the scale or other deposit is scraped off before any substantial accumulation may take place. It is another object of our invention to ensure against improper operation of these chains or other abrading devices, by shutting down the actuating motor and the still automatically in response to the breaking of the chains, or clogging of the tubes, or other unsatisfactory condition.

Our invention possesses other advantageous features, some of which with the foregoing will be set forth at length in the following description, where we shall outline in full that form of our invention which we have illustrated in the drawings accompanying and forming part of the present specification. Although we have shown in the drawings but one form of our invention as applied to a vertical cracking still, it is to be understood that we do not intend to limit it to that embodiment or to its use in connection with cracking apparatus, since the invention as defined in the claims may be embodied in many other forms.

Referring to the drawings:

Figure 1 is a diagrammatic view of a control system embodying our invention as applied to a vertical cracking still; and Fig. 2 is an enlarged view of the oil and fuel control mechanism shown in Fig. 1.

A diagrammatic section of the cracking still 1 is shown at the left hand side of Fig. 1. The supply of liquid hydrocarbon to the still is effected through a pipe 2, which is connected to any source of pressure, as a pump 101 electrically driven by current derived from mains 91 and 92. The temperature necessary for carrying on the process of cracking may be conveniently produced by the combustion of liquid fuel in a chamber 3 surrounding the still 1, which chamber has a passage 4 for carrying off the products of combustion.

In the present instance a vertical type of still is disclosed, in which there are a plurality of tubes 5 for accommodating the liquid hydrocarbon. A lower header 6 connects to all of the tubes, and serves as an inlet chamber. The upper header 7 provides an outlet chamber, the products of the cracking process passing off from this chamber, as by the aid of the vertical pipe 8. A pressure governor 9 is illustrated, for maintaining the pressure in the still 1 at a constant predetermined value. Chains 10 threaded through the tubes 5 may be driven by any appropriate device, as for instance the small electric motor 11. This motor is diagrammatically illustrated as directly coupled to the shaft 12 on which the chain sheaves 13 are placed.

For proper and efficient operation of the still 1, it is essential to maintain the level of the hydrocarbon in the still at or near a definite level, indicated at 14. We provide an arrangement whereby variations in this level cause the actuation of a source of power to vary the amount of hydrocarbon supplied through pipe 2, as by operating valves or by controlling the operation of a pump that supplies the oil. It is preferable also to vary the rate of combustion of the liquid fuel in the chamber 3. These functions may be conveniently performed by a small electric motor 15, although of course other sources of power may be used. This motor, through a system of gearing 16 and levers 17 and 18, is arranged in this instance to vary the opening of the valves 19 and 20 in the oil pipe 2 and fuel line 21, respectively. This mechanism is most clearly illustrated in Fig. 2. The levers 17 and 18 may be adjustably connected with the valves 19 and 20, as by the aid of the quadrants 22 and 23. These quadrants are fixed to the valves and are secured to the levers 17 and 18, which are rotatable about the axes of the valve, by the aid of fastening devices, so that any relative angular position may be obtained between the valves and their operating levers. In this way the proper simultaneous control for the valves 19 and 20 may readily be secured. The control may be such that valve 20 is either closing or opening while the other valve 19 is closing, dependent upon the particular conditions met with. Furthermore, the automatic control may be confined to the oil valve 19. At any rate, at the start, both valves are manually opened to such positions as to produce the desired level in the still 1, and then the mechanism including levers 17 and 18 are coupled thereto.

In case automatic control is not desired temporarily, by-passes 24 and 25 are provided for the automatically operated valves 19 and 20, and manually controlled valves 26 and 27 in said by-passes. A check valve 28 may also be provided in the oil line 2 to prevent back flow of the oil. The liquid fuel is arranged to be burned at a burner 29 located near the combustion chamber 3.

A small motor 15 is arranged to be rotated in either direction to operate the valves 19 and 20. For this purpose it may be provided with a pair of opposed series field windings 30 and 31 each of which may be rendered active to influence the armature of motor 15. The energization of these windings and of the motor 15 is effected automatically in response to variations in the oil level 14. How this is accomplished will now be set forth.

A practicable scheme of control must be such that will operate surely and quickly, and without interfering with the maintenance of air tight conditions in the still. We have found that a temperature responsive element 32 is admirably suited to provide the controlling force. There usually is a variation of 100° Fahrenheit or more in the temperature of the oil and of the vapors immediately above it, and when this element is subjected to these differences by the rise and fall of the liquid level 14, it responds strongly to this large variation in temperature. In order to utilize this variation in the best manner, we prefer to use for the element 32, a cell enclosing a gas or volatile liquid arranged to exert a large pressure on temperature variation, such as nitrogen or ether. The variations in pressure created in the cell 32 is caused to affect a pressure gauge 33, by the aid of a connection 34. The movable element 35 of this gauge, which may be of any standard suitable form, is limited in its movement by a pair of stationary contacts 36 and 37 placed on opposite sides thereof. The separation of these contacts represents the permissible temperature variation of element 32 beyond which the motor 15 is actuated in one or the other direction, dependent upon which of the stationary contacts is engaged by the movable contact carried by the member 35. Thus in case the temperature suddenly decreases, corresponding to a recession of the oil level 14, contact is established at point 36, whereas in case the temperature suddenly increases, corresponding to a rise in the oil level completely covering element 32, contact is established at point 37. The position of contacts 36 and 37 is preferably variable to adjust the range of the control, as by mounting them on movable pointers coaxial with the pointer 35.

The contacts 36 and 37 may control the energization of intermediate relays or switches to affect the motor 15. We have illustrated one form of such relays in a purely diagrammatic manner, at 39 and 40. Thus upon a recession of the oil level, the circuit for relay 39 is completed: from one main 41, the left hand side of switch 42, relay 39, contact 36, member 35, connection 42', the right hand side of switch 42, back to the other main 43. A lever 44 which is normally maintained in a neutral position by any appropriate means, as for instance the springs 45, is lifted up in response to the energization of electromagnetic relay 39, and contact is established between a stationary point 46 and a point 47 carried by lever 44. This contact completes the circuit for motor 15, as follows: left hand side of switch 42, connection 48, armature of motor 15, field 31, connection 49, contacts 46 and 47, connection 50, and the right hand side of switch 42. The motor 15 is caused to rotate in a direction to open the valves 19 and 20 and thus to raise the level of the hydrocarbon in the still. As soon as the level of the element 32 is reached, this element is subjected to an increased temperature, and member 35 moves away from contact 36. This puts a stop to the motor operation.

While the pressure cell 32 is partially covered by the hydrocarbon, its temperature is high enough to keep member 35 away from contact 36; but in case the level of the liquid should rise beyond this element, its temperature would be increased by an amount sufficient to cause contact 37 to be engaged by the pointer 35. When this occurs, the electromagnet 40 is energized, and contact 51, carried by lever 44, engages stationary contact 52. The motor circuit is now completed through the following path: the left hand side of switch 42, connection 48, armature of motor 15, field winding 30, contacts 52 and 47, connection 50, and the right hand side of switch 42. It is to be noted that now the winding 30 is active, and winding 31 is inactive, so that motor 15 rotates in a direction opposite to that described heretofore, and valves 19 and 20 are moved to closing position. As soon as the level of the oil is lowered to the proper position, the member 35 recedes from contact 37.

The automatic level controller as described may function without any attention from the operator. Although but one form of control is described, involving the use of electric circuits, it is evident that other forms of control may be devised which are sensitive to temperature changes in the element 32, and that this scheme in general is adaptable in many other relations than merely in a cracking still.

It may sometimes become imperative to shut down the still 1 immediately; as for instance on the occurrence of an abnormal variation in liquid level. Such a variation may result from a leak or from improper functioning of the pressure valve 9. We arrange matters in such a way that the fuel and oil supply, through pipes 2 and 21 is interrupted upon the occurrence of these abnormal conditions. For this purpose valves 53 and 54 are provided, which are normally open, but which may be closed by pulling downwardly on bar 55 connected as by levers 56 and 57 to these valves. The particular arrangement described is illustrated most clearly in Fig. 2. A heavy duty spring 58 constantly tends to pull the bar 55 to closing position, but may be prevented from doing so by the aid of a latch 59. This latch is pivotally carried by the bar 55 and cooperates with a stationary member 60 to hold the bar 55 raised. Latch 59, however, is urged in a direction to disengage it, as by a spring 61. An electro-magnet 62 is so arranged that while it is energized, the force of this spring 61 is overcome, the latch 59 being attracted by the magnet and held in the position shown in the figure. However, deenergization of this magnet 62 allows spring 61 to pull the latch 59 away from the stationary catch 60. The spring 58 is then free to act to close the valves 53 and 54. When magnet 62 is again energized sufficiently, the bar 55 may be manually returned to engaging position.

The circuit for the electromagnet 62 is controlled in response to the occurrence of abnormal conditions, so that thereupon its energization is reduced sufficiently to release the latch 59 and thus to cause the shutting down of the still. Any of several different factors may cause this occurrence. Thus in case the level 14 of the oil becomes dangerously high, a thermal responsive element 63 enclosed in the header 7 is subjected to an increased temperature. The result is that a pointer 64 of a pressure gauge 65 is caused to engage a stationary contact 66. The circuit for a control relay 67 is then completed, as follows: from the left hand terminal of the secondary 68 of a step down transformer 69, the left hand blade of a switch 70, connection 71, magnet 67, connections 72 and 73, contacts 64 and 66, connection 75, switch 74, connection 76, right hand blade of switch 70, to the right hand terminal of transformer 69. The energization of magnet 67 causes contacts 77 and 78 to separate, and thereby to open the circuit through the control magnet 62. The manually operated switch 74 is provided to permit rendering this control temporarily inactive when starting the still in operation.

In an analogous manner, the circuit of electro-magnet 62 is opened in response to an abnormally low position of level 14. For this condition, a thermal responsive element 79 is subjected to the abnormally low temperatures of the vapors above the receded level, and causes a pointer 80 of a gauge 81 to engage the stationary contact 82. The circuit for the relay 67 is then complete, through connection 71, magnet 67, connections 72 and 83, contacts 80 and 82, switch 74 and connection 76. In response to the closure of this circuit, contacts 77 and 78 again separate, and magnet 62 is deenergized.

In order to control the circuit for the magnet 62 for abnormal variations in gas pressure in the header 7, a pressure gauge 84 is utilized, which is directly connected by a line 85 to the upper portion of this header. A pair of adjustable stationary contacts 86 and 87 are arranged in the path of the moving pointer 88 of this gauge, so that on a predetermined low or high pressure, contact is established between the pointer and one or the other of the stationary contacts 86 and 87. Upon this occurring, the electro-magnet 67 is energized, through the following circuit: connection 76, switch 74, either through contact 86 or 87, pointer 88, connections 89 and 72, magnet 67 and connection 71. As explained hereinbefore the completion of this circuit causes the deenergization of the magnet 62, and consequent release of the spring 58 to close the valves 53 and 54.

A brief review of the operation of the safety controls may now be set forth. Upon starting the still in operation, the switches 74 and 42 are opened, and the switch 70 closed; the bar 55 is latched in valve opening position, and the fuel is ignited at the burner 29. As soon as the level 14 in the still comes up to about that indicated at 14, and the pressure in header 7 is about that desired, switches 74 and 42 are closed. From then on, the control is automatic, and proceeds in response to variations in level and in pressure. An abnormally high or low level will actuate magnet 67 to open the normally closed circuit of magnet 62, and thereby to release latch 59. An abnormally high or low pressure effects the same result through the pressure gauge 84.

The safety controls just described may operate in response to other conditions which have not as yet been touched upon. Thus in case the pump that forces the oil through pipe 2 should for any reason become inoperative, such for example as may be due to failure of electric or steam power driving the pump, the result is a decrease in the height of the oil in the still, or a decrease in the pressure in header 7, or both. Under any of these conditions, either one or both of the gauges 81 and 84 will function to shut down the entire system as described. Of course other devices may be utilized to effect this result. On the other hand, failure of the fuel supply will cause temperature and pressure changes in header 7 that will also accomplish this function.

The small motor 11 for moving the chains 10 is adapted to be supplied with electric energy through a circuit breaker 90, from the mains 91 and 92. An instrument 93 is arranged, however, to control this circuit breaker 90 and thereby to cause the motor to stop, on the occurrence of abnormal conditions of the motor circuit, such as an abnormally high load, indicating for example a clogged tube, or tangling of the chains due to breakage or the like. The circuit may also be arranged to stop the motor on an abnormally low load. In addition, control relay 67 may be energized to render the entire still inoperative. In the present instance the instrument 93 is shown as an ammeter, having its operating coil 94 connected in series relation with the motor 11. Upon the occurrence of an underload, pointer 95 connects with stationary contact 96, the position of which may be adjusted. Similarly, upon the occurrence of an abnormally high load, pointer 95 connects with adjustable stationary contact 97. In either case, the circuit for the circuit breaker coil 98 and for relay 67 is completed as follows: the left hand blade of switch 70, connection 71, coil 67, connection 99, either contact 96 or 97, pointer 95, coil 98, connection 100, switch 74, connection 76, to the right hand blade of switch 70. The energization of coil 98 thus trips the circuit breaker 90, which remains open until manually reset; this is to be accomplished only after the trouble with motor 11 has been found and remedied. Furthermore, relay 67 is also energized and causes latch 59 to permit spring 58 to close valves 53 and 54, and thus to render the entire still inactive.

From the foregoing description it is evident that we have provided a simple and convenient form of control for a pressure still, that is reliable in operation and simple to manipulate.

We claim:

1. In combination, a container for a liquid to be vaporized, means for causing the liquid to vaporize, and means for indicating whether the liquid is above or below a definite level in the container, comprising a vessel placed within said container at the said level, said vessel enclosing a fluid the pressure of which varies in accordance with the temperature to which it is subjected, and a device responsive to said pressure variations.

2. In a system for altering the character of a liquid by the application of heat to vaporize it, a container for the liquid, means for supplying the container with the liquid, and means for controlling said supplying means, comprising a thermal responsive element arranged at the desired level of liquid, whereby it responds to the difference in temperature between the liquid and the vaporized matter above the liquid as the level varies, contacts operated by said element, and a source of motion controlled by said contacts for varying the rate of supply of the liquid.

3. In a heat exchange system, a container for liquid, controllable means for supplying heat to said container, and means for controlling said controllable means comprising a thermal responsive element disposed in said container adjacent the liquid level so as to be either immersed in the liquid or subjected to the vapor above the liquid, means responsive to the temperature of said element when immersed in the liquid for increasing the supplying of heat to the container and responsive to the lower temperature of said element when subjected to the temperature of the vapor above the liquid for decreasing the supplying of heat to the container.

4. In a heat exchange system, a container for liquid, controllable means for supplying heat to said container, and means for controlling said controllable means comprising means including a temperature responsive element within the container for indicating the level of liquid in the container, said element being positioned adjacent the liquid level so as to be either immersed in the liquid or subjected to the vapor above the liquid, means responsive to the temperature of said element when immersed in the liquid for increasing the supplying of heat to the container and responsive to the lower temperature of said element when subjected to the temperature of the vapor above the liquid for decreasing the supply of heat to the container.

5. In a system for altering the character of a liquid by the application of heat to vaporize it, a container for the liquid, means for supplying the container with the liquid, means for heating the liquid, a device causing a variation in fluid pressure when subjected to a variation in temperature, by the aid of a volatile liquid, said device being arranged in the container at the desired level of liquid, whereby it responds to the difference in temperature between the liquid and the vaporized matter above the liquid, as the level varies, and means for simultaneously controlling the liquid supplying means and the heating means in accordance with the variations in said fluid pressure.

6. In a system for altering the character of a liquid by the application of heat to vaporize it, a container for the liquid, means for supplying the container with the liquid, means for heating the liquid, and means for simultaneously controlling the liquid supplying means and the heating means in response to variations in the level of the liquid, comprising a thermal responsive element arranged at the desired level of liquid, whereby it responds to the difference in temperature between the liquid and the vaporized matter above the liquid, as the level varies, contacts operated by said element, and a source of motion controlled by said contacts and arranged to vary the rate of supply of the liquid and to alter the operation of the heating means.

7. In a system for cracking liquid hydrocarbons, a still for the hydrocarbon, means for supplying the hydrocarbon to the still, a thermal responsive element arranged at the desired level of the hydrocarbon, whereby it responds to the difference in temperature between the hydrocarbon and the vapors above it, as the level changes, and means for controlling the supplying means in accordance with the thermal condition of said element.

8. In a system for cracking liquid hydrocarbons, a still for the hydrocarbon, means for supplying the hydrocarbon to the still, and means for controlling said supplying means, comprising a thermal responsive element arranged at the desired level of the hydrocarbon, whereby it responds to the difference in temperature between the hydrocarbon and the vapors above it, as the level changes, contacts operated by said element, and a source of motion controlled by said contacts and arranged to vary the rate of supply of the hydrocarbon.

9. In a system for cracking liquid hydrocarbons, a still for the hydrocarbon, means for supplying the hydrocarbon to the still, means for applying heat to the still, a thermal responsive element arranged at the desired level of the hydrocarbon, whereby it responds to the difference in temperature between the hydrocarbon and the vaporized matter above the hydrocarbon as the level varies, and means for simultaneously controlling the supplying means and the heating means in accordance with the thermal condition of the element.

10. In a system for cracking liquid hydrocarbons, a still for the hydrocarbon, means for supplying the hydrocarbon to the still, means for applying heat to the still, and means for simultaneously controlling the supplying means and the heating means in response to variations in the level of the hydrocarbon, comprising a thermal responsive element arranged at the desired level of the hydrocarbon, whereby it responds to the difference in temperature between the hydrocarbon and the vaporized matter above the hydrocarbon as the level varies, contacts operated by said element, and a source of motion controlled by said contacts and arranged to vary the rate of supply of the hydrocarbon and to alter the operation of the heating means.

11. A system of the class described comprising a container for hydrocarbons to be treated, means for supplying a hydrocarbon to the container, means including a movable element for controlling said first mentioned means, means for supplying heat to said hydrocarbon, means including a second movable element for controlling the amount of heat supplied, and adjustable means interconnecting said movable elements external of the container whereby movement of the one causes movement of the other to simultaneously control both the supplying of hydrocarbon and heat.

12. In a system of the class described comprising a container for hydrocarbon, means for supplying hydrocarbon to the same, means for supplying heat to the hydrocarbon, and means responsive to a pressure within the container above a predetermined maximum value for interrupting the supplying of heat and means responsive to a like pressure for interrupting the supplying of hydrocarbon to the container.

13. A cracking still having a passageway for hydrocarbon to be treated, a member disposed in the passageway and arranged to be constantly moved therein to prevent the accumulation of deposits, means for continuously driving this member, and means responsive to load conditions of said driving means for rendering the driving means inactive.

14. A cracking still having a passageway for hydrocarbon to be treated, a member disposed in the passageway and arranged to be moved therein to prevent the accumulation of deposits, means for continuously driving this member, and means responsive to an excessive load demand on the driving means for rendering the driving means inactive.

15. A cracking still having a passageway for hydrocarbon to be treated, a member disposed in the passageway and arranged to be moved therein to prevent the accumulation of deposits, means for continuously driving this member, and means responsive to a light load demand on the driving means for rendering the driving means inactive.

16. A cracking still having a passageway for hydrocarbon to be treated, a chain in the passageway arranged to be constantly driven to prevent the accumulation of deposits, an electric motor for driving the chain, and means responsive to load conditions on the motor for deenergizing the motor.

17. A cracking still having a passageway for hydrocarbon to be treated, a chain in the passageway arranged to be constantly driven to prevent the accumulation of deposits, an electric motor for driving the chain, and means responsive to the breaking of the chain for deenergizing the motor.

18. A cracking still having a passageway for hydrocarbon to be treated, a chain in the passageway arranged to be constantly driven to prevent the accumulation of deposits, an electric motor for driving the chain, and means responsive to an excessive load demand and a light load demand for deenergizing the motor.

19. A still having a container for hydrocarbon to be treated, means for supplying heat to said container, a member in the container adapted to be driven to prevent accumulation of deposits, means for driving said member, and means responsive to the load on said driving means for controlling the heat supplied to the container.

20. A still having a container for hydrocarbon to be treated, means for supplying heat to said container, a member in the container adapted to be driven to prevent accumulation of deposits, means for driving said member, and means responsive to an abnormal load on said driving means for decreasing the heat supplied to the container.

21. A still having a container for hydrocarbon to be treated, means for supplying hydrocarbon to said still, a member in the container adapted to be driven to prevent accumulation of deposits, means for driving said member, and means responsive to the load on said driving means for controlling the supplying of hydrocarbon to the container.

22. A still having a container for hydrocarbon to be treated, means for supplying hydrocarbon to said still, a member in the container adapted to be driven to prevent accumulation of deposits, means for driving said member, and means responsive to an abnormal load on said driving means for controlling the supplying of hydrocarbon to the container.

23. A still having a container for hydrocarbon to be treated, means for supplying hydrocarbon to said still, means for supplying heat to the container, a member in the container adapted to be driven to prevent accumulation of deposits, means for driving said member, means responsive to an abnormal load on said driving means for controlling the supplying of hydrocarbon to the container, and means responsive to the same abnormal load for controlling the supplying of heat to the container.

24. A still having a container for hydrocarbon to be treated, means for supplying hydrocarbon to said still, means for supplying heat to the container, a member in the container adapted to be driven to prevent accumulation of deposits, means for driving said member, means responsive to an unusually light load on said driving means for controlling the supplying of hydrocarbon to the container.

25. A still having a container for hydrocarbon to be treated, means for supplying hydrocarbon to said still, means for supplying heat to the container, a member in the container adapted to be driven to prevent accumulation of deposits, means for driving said member, means responsive to an unusually light load on said driving means for controlling the supplying of heat to the container.

26. A still having a container for hydrocarbons to be treated, means for supplying hydrocarbon to said still, means for supplying heat to the container, a member in the container adapted to be driven to prevent accumulation of deposits, means for driving said member, means for limiting the load on said driving means to a predetermined maximum value, means for controlling the supplying of hydrocarbon to said still when the load on said driving means reaches said predetermined value.

27. A still having a container for hydrocarbons to be treated, means for supplying hydrocarbon to said still, means for supplying heat to the container, a member in the container adapted to be driven to prevent accumulation of deposits, means for driving said member, means for limiting the load on said driving means to a predetermined maximum value, and means for controlling the supplying of heat to the container when the load on said driving means reaches said predetermined value.

28. A heat exchange system comprising a container, means for supplying liquid to the container, means for supplying heat to the liquid within the container, means tending to maintain the level of the liquid substantially constant during normal operation, and means independent of said last named means for interrupting the supplying of liquid responsive to an abnormal rise of the liquid level to a predetermined maximum value.

29. A heat exchange system comprising a container, means for supplying liquid to the container, means for supplying heat to the liquid within the container, means tending to maintain the level of the liquid substantially constant during normal operation, and means including a temperature responsive element independent of said last named means for interrupting the supplying of liquid, said last named means being responsive to an abnormal rise of the liquid level to a predetermined maximum value.

30. A heat exchange system comprising a container, means for supplying liquid to the container, means for supplying heat to the liquid within the container, means tending to maintain the level of the liquid substantially constant during normal operation, and means independent of said last named means for interrupting the supplying of heat responsive to an unusual drop in the liquid level to a predetermined minimum value.

31. A heat exchange system comprising a container, means for supplying liquid to the container, means for supplying heat to the liquid within the container, means tending to maintain the level of the liquid substantially constant during normal operation, and means including a temperature responsive element disposed in the container for interrupting the supplying of heat, said last named means being responsive to an unusual drop in the liquid level to a predetermined minimum value.

In testimony whereof, we have hereunto set our hands.

GEORGE W. WALLACE.
HARRY K. IHRIG.